United States Patent
Lee et al.

(10) Patent No.: US 11,601,705 B2
(45) Date of Patent: *Mar. 7, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Heeran Lee, Suwon-si (KR); Mugong Bae, Suwon-si (KR); Namsu Ha, Suwon-si (KR); Byeol Park, Suwon-si (KR); Bongseok Lee, Suwon-si (KR); Gohwoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,156

(22) Filed: Aug. 13, 2021

(65) Prior Publication Data

US 2021/0377588 A1 Dec. 2, 2021

Related U.S. Application Data

(63) Continuation of application No. 16/894,284, filed on Jun. 5, 2020, now Pat. No. 11,122,319.

(30) Foreign Application Priority Data

Jun. 19, 2019 (KR) .......................... 10-2019-0072969

(51) Int. Cl.
*H04N 21/422* (2011.01)
*H04N 21/442* (2011.01)

(52) U.S. Cl.
CPC . *H04N 21/42206* (2013.01); *H04N 21/44204* (2013.01)

(58) Field of Classification Search
CPC .................. H04N 21/42206; H04N 21/44204
See application file for complete search history.

(56) References Cited

U.S. PATENT DOCUMENTS 9,948,975 B2   4/2018   Greene
10,388,150 B2   8/2019   Park et al.
(Continued)

FOREIGN PATENT DOCUMENTS

EP   3 190 571 A1   7/2017
EP   3 190 796 A1   7/2017
(Continued)

OTHER PUBLICATIONS

Communication dated Feb. 9, 2022, issued by the European Patent Office in European Application No. 20827355.7.
(Continued)

*Primary Examiner* — Kyu Chae
(74) *Attorney, Agent, or Firm* — Sughrue Mion, PLLC

(57) ABSTRACT

An electronic apparatus includes a communication interface; a memory storing a control code information of a content providing apparatus; and at least one processor configured to: based on repeatedly receiving, from a remote controller, a control signal for changing a volume value of the electronic apparatus more than a threshold number of times through the communication interface, obtain state information of the content providing apparatus, identify a current volume value of the content providing apparatus or a state of the content providing apparatus, based on the state information, and based on the current volume value of the content providing apparatus being less than or equal to a threshold value or the content providing apparatus being in a mute state, control the communication interface to transmit a control signal to change the volume value of the content (Continued)

providing apparatus to the remote controller based on the stored control code information.

20 Claims, 10 Drawing Sheets

(56) References Cited

U.S. PATENT DOCUMENTS

| | | | |
|---|---|---|---|
| 10,432,886 B2 | 10/2019 | Yoon et al. | |
| 11,122,319 B2* | 9/2021 | Lee | H04N 21/44204 |
| 2006/0018493 A1 | 1/2006 | Oh et al. | |
| 2010/0146445 A1 | 6/2010 | Kraut | |
| 2014/0302799 A1* | 10/2014 | Kwon | H04M 1/72466 |
| | | | 455/68 |
| 2016/0342379 A1 | 11/2016 | Keipert et al. | |
| 2018/0012485 A1 | 1/2018 | Park et al. | |
| 2018/0070125 A1 | 3/2018 | Lee et al. | |
| 2018/0077375 A1 | 3/2018 | Lee et al. | |
| 2018/0146156 A1* | 5/2018 | Lee | H04N 5/63 |
| 2018/0157462 A1 | 6/2018 | Innes et al. | |

FOREIGN PATENT DOCUMENTS

| | | |
|---|---|---|
| JP | 2007-67539 A | 3/2007 |
| KR | 10-1998-078731 A | 11/1998 |
| KR | 10-2007-0110583 A | 11/2007 |
| KR | 10-0790102 B1 | 1/2008 |
| KR | 10-0820673 B1 | 4/2008 |
| KR | 10-2008-0046887 A | 5/2008 |
| KR | 10-2010-0129440 A | 12/2010 |
| KR | 10-2017-0082005 A | 7/2017 |
| KR | 10-2018-0004959 A | 1/2018 |
| KR | 10-2018-0027901 A | 3/2018 |
| KR | 10-2018-0028703 A | 3/2018 |
| WO | 2006/020560 A2 | 2/2006 |

OTHER PUBLICATIONS

International Search Report (PCT/ISA/210) dated Sep. 3, 2020 by the International Searching Authority in counterpart International Patent Application No. PCT/KR2020/006876.

Written Opinion (PCT/ISA/237) dated Sep. 3, 2020 by the International Searching Authority in counterpart International Patent Application No. PCT/KR2020/006876.

Communication dated Jun. 29, 2022 issued by the European Patent Office in European Application No. 20827355.7.

* cited by examiner

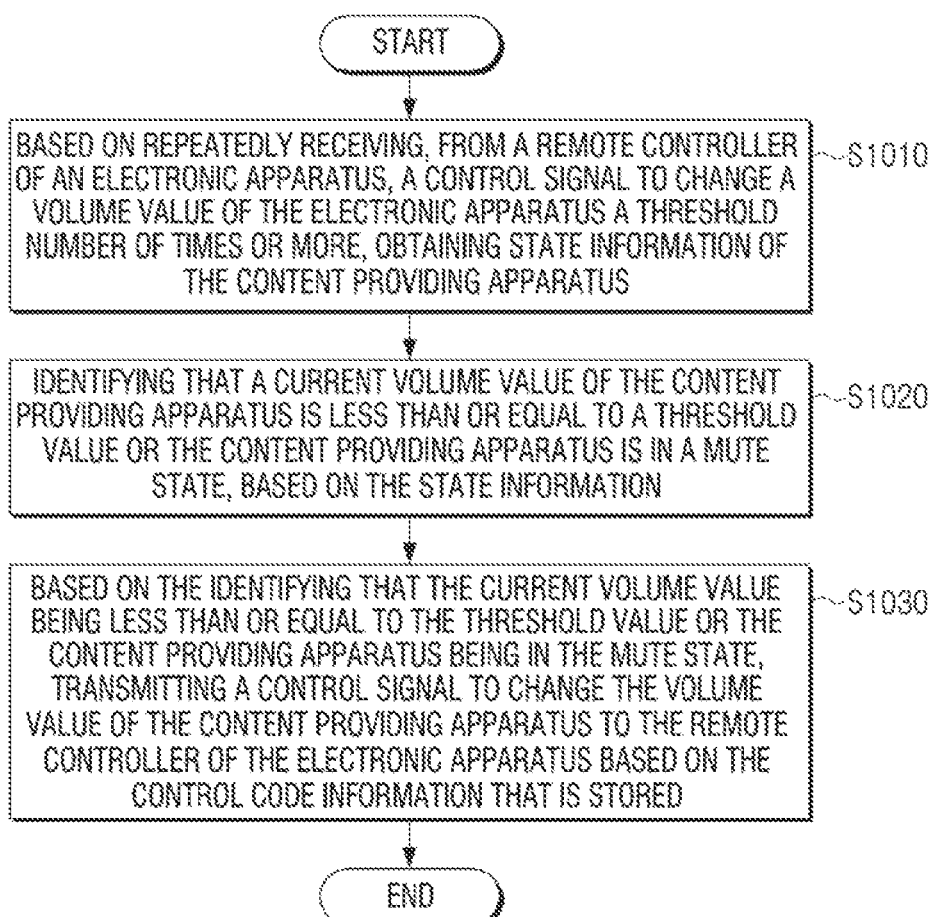

ELECTRONIC APPARATUS AND CONTROLLING METHOD THEREOF

CROSS-REFERENCE TO RELATED APPLICATION

This is a continuation application of U.S. patent application Ser. No. 16/894,284, filed Jun. 5, 2020, in the U.S. Patent and Trademark Office, which is based on and claims priority under 35 U.S.C. § 119 to Korean Patent Application No. 10-2019-0072969, filed on Jun. 19, 2019, in the Korean Intellectual Property Office, the disclosure of which is incorporated by reference herein in its entirety.

BACKGROUND

1. Field

The disclosure relates to an electronic apparatus for receiving content from a content providing apparatus and a controlling method thereof.

2. Description of Related Art

As a content source (a content providing apparatus) providing content to a television (TV) varies, a content source is frequently changed according to a preference and different situations of a user. For example, a user may select a set-top box, an application installed in a TV, a smart phone, or the like, as a content source and watch content provided therefrom through a TV.

When a content source is changed, even if a current setting volume of the changed content source is small or the content source is in a mute state, a user may not recognize this and may adjust the volume of a TV by a remote controller of the TV. In this example, even if the TV volume is adjusted to be high, the volume heard by the user is not greatly increased due to the set volume state of the content source, and thus there may be a problem in that the user mistakenly recognizes that the TV has a defect.

In addition, having a separately operated remote controller for adjusting the volume of the content source may be an inconvenience.

SUMMARY

In accordance with an aspect of the disclosure, an electronic apparatus includes a communication interface comprising circuitry; a memory storing a control code information of a content providing apparatus; and at least one processor configured to: based on repeatedly receiving, from a remote controller, a control signal for changing a volume value of the electronic apparatus more than a threshold number of times through the communication interface, obtain state information of the content providing apparatus, identify a current volume value of the content providing apparatus or a state of the content providing apparatus, based on the state information, and based on the current volume value of the content providing apparatus being less than or equal to a threshold value or the content providing apparatus being in a mute state, control the communication interface to transmit a control signal to change the volume value of the content providing apparatus to the remote controller based on the control code information that is stored in the memory.

The at least one processor may be further configured to: identify the content providing apparatus based on at least one of a connection history of the content providing apparatus or a control signal received from a remote controller of the content providing apparatus, and obtain the control code information corresponding to the identified content providing apparatus from the memory.

The at least one processor may be further configured to: obtain the control signal which the remote controller of the content providing apparatus transmits to the content providing apparatus by sniffing, and identify at least one candidate control code information associated with the obtained control signal, transmit a control signal based on each of the at least one candidate control code information to the remote controller of the electronic apparatus, identify one of the at least one candidate code information based on a response state of the content providing apparatus in response to the remote controller of the electronic apparatus transmitting the control signal of the identified one of the at least one candidate code information to the content providing apparatus, and identify the content providing apparatus based on the identified one of the at least one candidate control code information.

The state information may include at least one of current volume information of the content providing apparatus, mute setting information of the content providing apparatus, or content information provided from the content providing apparatus.

The electronic apparatus may further include a display, wherein the at least one processor is further configured to, based on content currently output to the display being a specific type of content, control the communication interface so as not to transmit the control signal to the remote controller of the electronic apparatus, and wherein the specific type of content is content in which a volume value of the content providing apparatus is automatically adjusted to less than or equal to the threshold value or the mute state.

The at least one processor may be further configured to: obtain a plurality of captured images by capturing an output screen of the display in a predetermined cycle, and identify whether the specific type of content is output to the display based on a pixel value difference among the plurality of captured images.

The at least one processor may be further configured to: identify whether the volume value of the content providing apparatus reaches the threshold value based on the control signal to change the volume value of the content providing apparatus, and based on receiving the control signal to change the volume value from the remote controller of the electronic apparatus after the volume value of the content providing apparatus reaches the threshold value, change the volume value of the electronic apparatus.

The electronic apparatus may include a display. The at least one processor may be further configured to control display timing of at least one of a volume user interface (UI) of the content providing apparatus or a volume UI of the electronic apparatus so that the volume UI of the content providing apparatus does not overlap with the volume UI of the electronic apparatus.

The at least one processor may be further configured to determine whether the current volume value of the content providing apparatus is less than or equal to the threshold value or the content providing apparatus is in a mute state based on loudness K-weighted relative to full scale information included in an input signal transmitted from the content providing apparatus.

The at least one processor is further configured to identify a threshold volume value of the content providing apparatus using a learning network model.

In accordance with an aspect of the disclosure, a method for controlling an electronic apparatus having stored therein control code information of a content providing apparatus, the method comprising: based on repeatedly receiving, from a remote controller of the electronic apparatus, a control signal to change a volume value of the electronic apparatus a threshold number of times or more, obtaining state information of the content providing apparatus; identifying that a current volume value of the content providing apparatus is less than or equal to a threshold value or the content providing apparatus is in a mute state, based on the state information; and based on the identifying that the current volume value being less than or equal to the threshold value or the content providing apparatus being in the mute state, transmitting a control signal to change the volume value of the content providing apparatus to the remote controller of the electronic apparatus based on the control code information that is stored.

The method may further include identifying the content providing apparatus based on at least one of a connection history of the content providing apparatus or a control signal received from a remote controller of the content providing apparatus; and obtaining the control code information corresponding to the identified content providing apparatus.

Identifying the content providing apparatus may include obtaining the control signal which the remote controller of the content providing apparatus transmits to the content providing apparatus by sniffing, and identifying at least one candidate control code information associated with the obtained control signal, transmitting a control signal based on each of the at least one candidate control code information to the remote controller of the electronic apparatus, identifying one of the at least one candidate code information based on a response state of the content providing apparatus in response to the remote controller of the electronic apparatus transmitting the control signal of the identified one of the at least one candidate code information to the content providing apparatus, and identifying the content providing apparatus based on the identified one control code information.

The state information may include at least one of current volume information of the content providing apparatus, mute setting information of the content providing apparatus, or content information provided from the content providing apparatus.

The method may further include, based on content currently output being a specific type of content, not transmitting the control signal to the remote controller of the electronic apparatus. The specific type of content may be content in which a volume value of the content providing apparatus is automatically adjusted to less than or equal to the threshold value or the mute state.

The transmitting to the remote controller of the electronic apparatus may include obtaining a plurality of captured images by capturing an output screen of the display in a predetermined cycle, and identifying whether the specific type of content is output based on a pixel value difference among the plurality of captured images.

The method may further include identifying whether the volume value of the content providing apparatus reaches the threshold value from the control signal to change the volume value of the content providing apparatus; and based on receiving the control signal to change the volume value from the remote controller of the electronic apparatus after the volume value of the content providing apparatus reaches the threshold value, changing the volume value of the electronic apparatus.

The method may further include controlling display timing of at least one of a volume user interface (UI) of the content providing apparatus or a volume UI of the electronic apparatus so that the volume UI of the content providing apparatus does not overlap with the volume UI of the electronic apparatus.

Identifying that the current volume value of the content providing apparatus is less than or equal to the threshold value or the content providing apparatus is in a mute state may include identifying whether the current volume value of the content providing apparatus is less than or equal to the threshold value or the content providing apparatus is in a mute state based on loudness K-weighted relative to full scale information included in an input signal transmitted from the content providing apparatus.

The method may further include identifying a threshold volume value of the content providing apparatus using a learning network model.

BRIEF DESCRIPTION OF THE DRAWINGS

The above and other aspects, and advantages of certain embodiments of the present disclosure will be more apparent from the following detailed description, taken in conjunction with the accompanying drawings, in which:

FIG. 10 is a flowchart illustrating a method for controlling an electronic apparatus in which control code information of a content providing apparatus is stored according to an embodiment.

DETAILED DESCRIPTION

Figure 1:
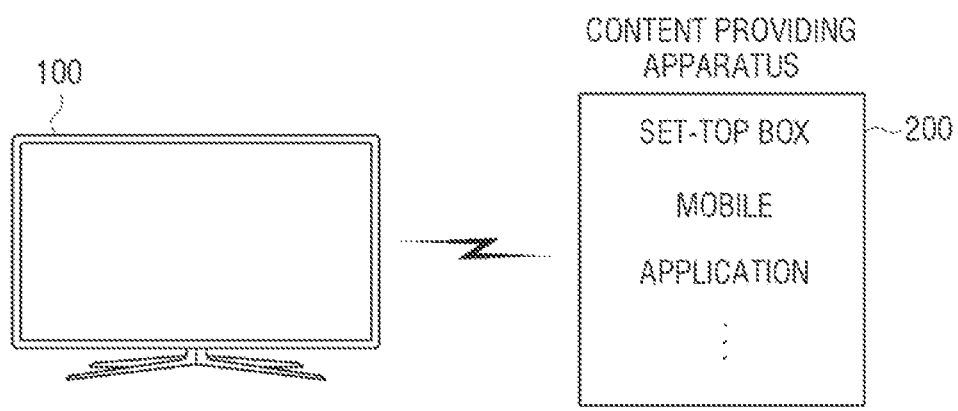
FIG. 1 is a diagram schematically illustrating a configuration of an electronic system according to an embodiment.

This disclosure provides an electronic apparatus for transmitting, to a remote controller of the electronic apparatus, a control signal to change a volume of a content providing apparatus by grasping a volume state of the content providing apparatus.

Embodiments will be described in greater detail below with reference to the accompanying drawings.

After terms used in the present specification are briefly described, the disclosure will be described in detail.

The terms used in the present disclosure and the claims are general terms identified in consideration of the functions of the various embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. When it is decided that a detailed description for the known art related to the disclosure may obscure the gist of the disclosure, the detailed description will be omitted.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

Expressions such as "at least one of A and/or B" and "at least one of A and B" should be understood to represent "A," "B" or "A and B."

Terms such as "first," "second," and the like may be used to describe various components, but the components should not be limited by the terms. The terms are used to distinguish a component from another.

In addition, a description that one element (e.g., a first element) is "(operatively or communicatively) coupled with/ to" or "connected to" another element (e.g., a second element) should be interpreted to include both the case that the one element is directly coupled to the other element, and the case that the one element is coupled to the another element through still another element (e.g., a third element).

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and may be realized in at least one processor. In the following description, a term "user" may refer to a person using an electronic device, or a device (for example, an artificial intelligence electronic device) using an electronic device.

Hereinafter, non-limiting embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification and drawings.

FIG. 1 is a diagram schematically illustrating a configuration of an electronic system according to an embodiment.

Referring to FIG. 1, an electronic system 10 may include an electronic apparatus 100 and a content providing apparatus 200.

The electronic apparatus 100 may be a device capable of receiving content from the content providing apparatus 200 and may be embodied as, but is not limited to, a display device such as a TV. In some non-limiting embodiments, the electronic apparatus 100 may be implemented as an image processing apparatus without a display, for example, a set-top box, a Blu-ray player, or the like that may be implemented to receive and transmit content to a display device. Alternatively, the electronic apparatus 100 may be implemented as various types of devices, such as a personal computer (PC), a laptop computer, a tablet, a smart phone, or the like.

The content providing apparatus 200 may be the primary content provider of the electronic apparatus 100. The content providing apparatus 200 may include at least one of a content provider and a content providing device. The content provider may provide content through a server using an application installed in the electronic apparatus 100 (e.g., You Tube™, Netflix™, or the like). The content providing device may be a set-top box, a Blu-ray player, a mobile phone, or the like, which are connected to the electronic apparatus 100.

If a volume value of the content providing apparatus 200 is set to be small or the content providing apparatus 200 is in a mute state, even though a user inputs to increase the volume of the electronic apparatus 100 through a remote controller of the electronic apparatus 100, the volume of the sound output to the user may slightly increase or may not actually increase. The mute state represents a state in which a mute button is pressed on the content providing apparatus 200 or a remote controller of the content providing apparatus 200, or a volume value of the content providing apparatus 200 becomes zero (0) and there is not output sound.

For example, if the volume value of the set-top box is set to be low or the set-top box is in a mute state, even if the TV volume value is increased through the TV remote controller, the volume of the sound actually output through a speaker associated with the TV is not increased. Consequently, the user may misrecognize that the TV has a problem, or a separate operation to increase the volume value of the set-top box may be required.

Various non-limiting embodiments of controlling the content providing apparatus 200 by converting a command for controlling the volume value of the electronic apparatus 100 into a command for controlling the volume value of the content providing apparatus 200, based on the state of the content providing apparatus 200, will be described in detail.

Figure 2:
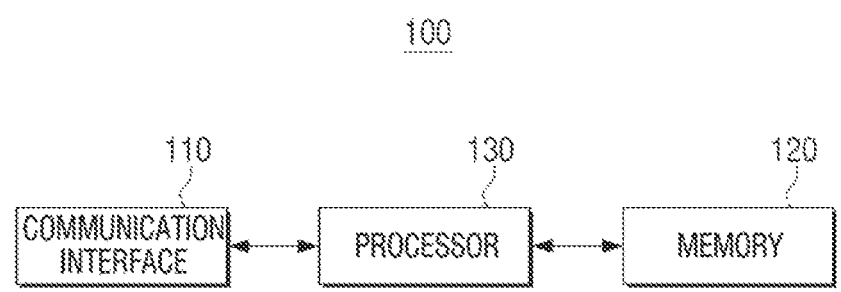
FIG. 2 is a block diagram illustrating an electronic apparatus according to an embodiment.

FIG. 2 is a block diagram illustrating an electronic apparatus according to an embodiment.

Referring to FIG. 2, the electronic apparatus 100 includes a communication interface 110, a memory 120, and a processor 130.

The communication interface 110, including circuitry, is configured to communicate with the content providing apparatus 200 and the remote controller of the electronic apparatus 100. Specifically, the communication interface 110 may receive content and identification information from each of the content providing apparatuses 200 and transmit, to the remote controller, a control signal to control the electronic apparatus 100 or the content providing apparatus 200.

The communication interface 110 may receive a control signal to manipulate the electronic apparatus 100 from a remote controller by a user command.

The communication interface 110 may include a Wi-Fi module, a Bluetooth module, an IR module, a local area network (LAN) module, a wireless communication module, or the like. Each communication module may be implemented as at least one hardware chip. The wireless communication module may include at least one communication chip performing communication according to various wireless communication standards such as ZigBee, Ethernet, universal serial bus (USB), mobile industry processor interface camera serial interface (MIPI CSI), $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like. This is merely exemplary, and the communication interface 110 may use at least one communication module among various communication modules.

For example, the communication interface 110 may transmit and receive a control signal to and from the remote controller via an infrared (IR) or Bluetooth communication scheme. When the content providing apparatus 200 is implemented as a smart phone using a mirroring function, the communication interface 110 may be implemented as a Wi-Fi module to receive content from the smart phone. Alternatively, if the content providing apparatus 200 is implemented as an application installed in the electronic apparatus 100, the communication interface 110 may be used as an application to receive content from an external server.

The communication interface 110 may include an input/output interface. In some embodiments, the communication interface 110 may be implemented as one interface including high-definition multimedia interface HDMI, mobile high-definition link (MHL), universal serial bus (USB), display port (DP), Thunderbolt, video graphics array (VGA) port, red-green-blue (RGB) port, d-subminiature (D-SUB), digital visual interface (DVI), or the like, and may receive content, state information, and identification information from the content providing apparatus 200. For example, if the content providing apparatus 200 is implemented as a set top box, content may be transmitted from a set top box connected by HDMI. The state information may include at least one of the current volume information of the content providing apparatus 200, the mute setting information of the content providing apparatus 200, or the content information provided from the content providing apparatus 200. The content providing apparatus 200 may include a unique identification number, an identification name, or the like. This will be described in detail below.

The memory 120 is electrically connected to the processor 130 and may store data necessary for various embodiments.

The memory 120 may be implemented as a memory embedded in the electronic apparatus 100, and/or may be implemented as a detachable memory in the electronic apparatus 100, according to the data usage purpose. For example, data for driving the electronic apparatus 100 may be stored in a memory embedded in the electronic apparatus 100, and data for an additional function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), or the like). In the case of a memory detachably mounted to the electronic apparatus 100, the memory may be implemented as a memory card such as, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

According to one embodiment, the memory 120 may store control code information of the content providing apparatus 200. The control code information may be information for controlling the content providing apparatus 200, and more specifically, the control code information may include information about each key of the remote controller of the content providing apparatus 200 and information about a control signal generated when each key is selected (e.g., a waveform). Which content providing apparatus 200 will be connected to the electronic apparatus 100 can be determined by the user, and the memory 120 may store control code information of each of the different contents providing devices 200. For example, the memory 120 may receive and store the control code information of the plurality of content providing apparatuses 200 from an external server under the control of the processor 130.

The memory 120 may also store a connection history of the content providing apparatus 200. The connection history of the content providing apparatus 200 may include control code information corresponding to the content providing apparatus 200 when there is a history of the electronic apparatus 100 being connected to the content providing apparatus 200.

The memory 120 may store identification information of the content providing apparatuses 200 that is providing content to the electronic apparatus 100.

In some cases, the control code information of the content providing apparatus 200 or connection history of the content providing apparatus 200, or the like, may be stored in an embedded server, an external server, or the like.

The processor 130 is electrically connected to the memory 120 and controls overall operations of the electronic apparatus 100.

The processor 130 according to an embodiment may be implemented as, for example, and without limitation, a digital signal processor (DSP) for processing of a digital signal, a microprocessor, a graphics processor (GPU), an AI (AI) processor, a neural processor (NPU), a time controller (TCON), or the like, but this is not limited thereto. The processor 130 may include, for example, and without limitation, one or more of a central processor (CPU), a micro controller unit (MCU), a micro-processor (MPU), a controller, an application processor (AP), a communication processor (CP), an advanced reduced instruction set computing (RISC) machine (ARM) processor, an artificial intelligence (AI) processor, or may be defined as a corresponding term. The processor 130 may be implemented in a system on chip (SoC) type or a large scale integration (LSI) type which a processing algorithm is built therein, or in a field programmable gate array (FPGA) type. The processor 130 may perform various functions by executing computer executable instructions stored in the memory 120.

The processor 130 may identify whether it is necessary to adjust a volume state of the content providing apparatus 200 based on a control signal received from a remote controller. In this example, a control signal of a predetermined type provided by the remote controller may be a trigger signal for the identification.

According to one embodiment, the processor 130 may identify whether a control signal for changing the volume value of the electronic apparatus 100 is received repeatedly a threshold number of times or more, or is received continuously for a threshold amount of time, from a remote controller via the communication interface 110. Here, the remote controller may be a remote controller for controlling the electronic apparatus 100. To prevent confusion with the remote controller of the content providing apparatus 200, the remote controller of the electronic apparatus 100 will be simply referred to as a "remote controller", and the remote controller corresponding to the content providing apparatus 200 will be referred to as "a remote controller of the content providing apparatus 200." Repeatedly receiving the control signal a threshold number of times or more may refer to a case in which a control signal is received a threshold number of times and more within a threshold time. The threshold time may be preset when the electronic apparatus 100 is manufactured, may be automatically set based on the usage history of the electronic apparatus 100, or may be set according to a user command.

If the volume value of the content providing apparatus 200 is set to be small or the content providing apparatus 200 is in a mute state, even if the volume value of the electronic apparatus 100 is increased, the volume of sound output to a user can be slight or the volume may not change. Consequently, the user may recognize that the volume adjustment operation is not performing properly, and may press the button for increasing the volume value of the remote controller more than or equal to a threshold number of times or press and hold the button more than or equal to a threshold time. Accordingly, if the control signal for changing the volume value from the remote controller is repeatedly received a threshold number of times or more, the processor 130 may determine that a change in the volume value of the content providing apparatus 200 is necessary.

According to an example, if the control signal for changing the volume value from the remote controller is repeatedly received a threshold number of times or more, the processor 130 may transmit a signal for changing the volume value of the content providing apparatus 200 to the remote controller. Here, the signal transmitted to the remote controller may include control code information for changing the volume value of the content providing apparatus 200. For example, the processor 130 may transmit control code information to increase the volume value of the content providing apparatus 200 by a predetermined level to the remote controller. The predetermined level may be pre-stored or identified (or determined) by the number of control signals received from the remote controller.

According to another example, the processor 130 may use at least a portion of the received plurality of control signals as a signal to change a volume value of the content providing apparatus 200. For example, the threshold number may be set to three times and a signal for continuously increasing the volume value may be received five times from the remote controller. In this example, the processor 130 may transmit, to the remote controller, a control signal for increasing the volume value of the electronic apparatus 100 for three steps in accordance with the first three signals received from the remote controller. Additionally, the processor 130 may recognize the first three signals as a trigger signal, and transmit, to the remote controller, a control signal for increasing the volume value of the content providing apparatus 200 by two steps according to the two signals transmitted after the tree times.

According to another embodiment, the processor 130 may obtain state information of the content providing apparatus 200 before transmitting the control signal to the remote controller, and determine whether to change the volume value of the content providing apparatus 200 based on the obtained state information. The state information of the content providing apparatus 200 may include at least one of the current volume information of the content providing apparatus 200, the mute setting information of the content providing apparatus 200, or the content information provided from the content providing apparatus 200.

If the current volume value of the content providing apparatus 200 is less than or equal to a threshold value or the content providing apparatus 200 is identified to be in a mute state based on the state information, the processor 130 may control the communication interface 110 to transmit a control signal to the remote controller to change the volume value of the content providing apparatus 200 based on the stored code information. Here, the mute state is a state in which the mute button is pressed by the remote controller of the content providing apparatus 200 or the volume value of the content providing apparatus 200 is 0, so that there is no output sound.

The processor 130 may identify whether the current volume value of the content providing apparatus 200 is below or equal to a threshold value or the content providing apparatus 200 is in a mute state based on the loudness K-weighted relative to full scale (LKFS) information included in the input signal transmitted from the content providing apparatus 200. Here, LKFS refers to a standard unit of a volume value calculated in consideration of a human auditory perception characteristic.

For example, if the volume of the sound corresponding to the predetermined volume value of the content providing apparatus 200 is $-24$ dB or less based on the LKFS information included in the input signal, the processor 130 may identify that the current volume value of the content providing apparatus 200 is less than or equal to a threshold value. If the volume of the sound corresponding to the predetermined volume value of the content providing apparatus 200 is less than $-80$ dB, the processor 130 may identify the content providing apparatus 200 to be in a mute state. This will be described in detail with reference to FIG. 6.

Accordingly, even if a control signal for changing the volume value of the electronic apparatus 100 is received from the remote controller, the processor 130 may transmit a control signal for changing the volume value of the content providing apparatus 200 to the remote controller based on at least a part of the received control signal, and the remote controller may change the volume value of the content providing apparatus 200 by transmitting the control signal to the content providing apparatus 200 based on the received control signal. The control signal transmitted by the remote controller to the content providing apparatus 200 may be a multi-brand remote (MBR) signal for controlling a device (content providing device 200) other than the electronic apparatus 100 which is set in the remote controller as a default, and may be the same signal as the control signal received from the electronic apparatus 100 or a signal which is changed from the received control signal.

In order for the processor 130 to transmit a control signal to change a volume value of the content providing apparatus 200 to the remote controller, the content providing apparatus 200 needs to be identified and the control code information corresponding to the identified content providing apparatus 200 needs to be obtained from the memory 120.

According to an embodiment, the processor 130 may identify the content providing apparatus 200 based on the identification information included in the input signal transmitted by the content providing apparatus 200. The processor 130 may obtain the identification information of the content providing apparatus 200 based on consumer electronics control (CEC) information or Infoframe, or the like. In this example, the CEC information may be information transmitted between devices supporting the CEC function which is a function of enabling devices connected by the HDMI to control each other, and may include identification information of each device. In addition, the Infoframe may include data transmitted from a source to a sink, and the data may include a video stream, an audio stream, identification information, or the like. The identification information may include a unique identification number, identification name, or the like, of the content providing apparatus 200. However, the embodiment is not limited thereto, and the content providing apparatus 200 may be identified using various information such as source identification information included in a captured screen, metadata included in the content, or the like.

When the content providing apparatus 200 is connected to the electronic apparatus 100 and identified, the processor 130 may generate connection history of the content providing apparatus 200. Afterwards, if the content providing apparatus 200 is connected to the electronic apparatus 100, the processor 130 may identify the content providing apparatus 200 based on the connection history.

According to another embodiment, the processor 130 may identify the content providing apparatus 200 based on the control signal of the content providing apparatus 200 received from the outside.

The processor 130 may identify the control signal that the remote controller of the content providing apparatus 200 transmits to the content providing apparatus 200 by sniffing, and may identify at least one candidate control code information related to the obtained control signal. The sniffing is an operation of hacking the packet information included in the control signal, and the processor 130 may identify the content providing apparatus 200 which is a target to which the control signal is to reach based on the packet information.

The processor 130 may identify at least one candidate control code information including packet information similar to the obtained packet information. Thereafter, the processor 130 may transmit each control signal based on the at least one candidate control code information to the remote controller of the electronic apparatus 100 and identify one of the at least one candidate control code information based on a response state of the content providing apparatus 200 as the remote controller transmits a control signal to the content providing apparatus 200.

For example, the identified candidate control code information may be a control code of the A, B, and C content providing apparatuses 200. The processor 130 may sequentially transmit a predetermined control signal included in the control code information of the A, B, and C to the remote controller and transmit a predetermined control signal, which is sequentially received by the remote controller, to the content providing apparatus 200. For example, the processor 130 may transmit a volume increase signal included in the A control code information, a volume increase signal included in the B control code information, and a volume increase signal included in the C control code information to the remote controller.

The processor 130 may identify one of the at least one candidate control code information based on the time at which the content providing apparatus 200 responds. For example, if the volume value of the content providing apparatus 200 increases after the remote controller transmits the volume increase signal included in the B control code information to the content providing apparatus 200, the processor 130 may identify the content providing apparatus 200 connected to the electronic apparatus 100 as a B content providing apparatus. Since the remote controller of the electronic apparatus 100 transmits a control signal included in the B control code information, the processor 130 may identify information that the control signal transmitted to the content providing apparatus 200 is a signal included in the B control code information, information on the time when the control signal is transmitted from the remote controller, and whether the content providing apparatus 200 responds based on the control signal. Thus, the processor 130 may identify whether the content providing apparatus 200 responds based on which control code information.

As another example, the processor 130 may transmit, to the remote controller, the control signal that performs different functions included in the control code information of the A, B, and C, and the remote controller may transmit different control signals to the content providing apparatus 200. For example, the processor 130 may transmit a volume increase signal included in the A control code information, a volume decrease signal included in the B control code information, and a channel change signal included in the C control code information to the remote controller.

The processor 130 may identify one of the at least one candidate control code information based on a response of the content providing apparatus 200. For example, if the content providing apparatus 200 performs a volume decrease function based on a control signal received from a remote controller, the processor 130 may identify that the content providing apparatus 200 connected to the electronic apparatus 100 is a B content providing apparatus.

The operation of transmitting by the processor 130 a control signal to a remote controller based on at least one candidate control code information may be performed when a new content providing apparatus 200 not present in the connection history is connected to the electronic apparatus 100.

As another example, the processor 130 may analyze an image displayed on a display to identify the content providing apparatus 200. Specifically, the processor 130 may transmit, to a remote controller, a control signal that the content providing apparatus 200 provides a specific image to the electronic apparatus 100. The remote controller may transmit the received control signal to the content providing apparatus 200 so that the content providing apparatus 200 may provide a specific image to the electronic apparatus 100. The specific image may be an image including the identification information of the content providing apparatus 200, and may be, for example, an image including a business logo of the content providing apparatus 200. For example, the provider logo may be included in a menu screen provided by the content providing apparatus 200, and the processor 130 may transmit, to the remote controller, a control signal displaying a menu screen included in the candidate control code information A, B, and C control code information. The menu screen may be an example, and if content capable of identifying the content providing apparatus 200 through image analysis is included, the control signal for displaying the corresponding image may be transmitted to the remote controller.

As another example, the processor 130 may transmit, to the remote controller, a control signal directing the content providing apparatus 200 to provide an image of a predetermined channel to the electronic apparatus 100. The remote controller may transmit the received control signal to the content providing apparatus 200 so that the content providing apparatus 200 may provide an image of a predetermined channel to the electronic apparatus 100. For example, if the content providing apparatus 200 is a set-top box, the same channel number may be provided to different broadcasting stations for each provider of the set-top box. For example, in A set-top box, the Columbia Broadcasting System (CBS) corresponds to the No. 1 channel, and in A set-top box, the National Broadcasting Company (NBC) corresponds to the No. 1 channel. In this example, the processor 130 may transmit, to the remote controller, a control signal to provide the image of the No. 1 channel to the electronic apparatus 100. If the processor 130 detects there is a CBS logo in the image by analyzing the image displayed on the display, the processor 130 may identify that the content providing apparatus 200 is an A set top box, and if the processor 130 detects there is an NBC logo in the image, the processor 130 may identify B set top box. The processor 130 may identify the logo in the image via a character recognition scheme, such as an optical character recognition (OCR).

If the content providing apparatus 200 is identified, the processor 130 may obtain all control code information corresponding to the identified content providing apparatus 200 from the memory 120. For example, if the processor 130 obtains only control code information related to a volume increase included in the A control code information to identify the content providing apparatus 200, and the identified content providing apparatus 200 is an A content providing apparatus, the processor 130 may obtain all control code information of the A content providing apparatus from the memory 120.

If the content currently output to the display is a specific type of content, the processor 130 may control the communication interface 110 so that the control signal for changing the volume value of the content providing apparatus 200 is not transmitted to the remote controller even if the control signal for changing the volume value of the electronic apparatus 100 is repeatedly received a threshold number of times or more from the remote controller. The content of a specific type may be content that the volume value of the content providing apparatus 200 is automatically adjusted to at least one of a threshold value or a mute state. For example, a specific type of content may be a menu screen provided by the content providing apparatus 200, and when a menu screen is displayed, the automatically output volume may be reduced. When the menu screen is displayed, all or a part of the display screen is hidden by the menu screen, so that the priority of the content displayed before the current menu screen is lower than the menu screen. In this case, the volume value of the content providing apparatus 200 may be automatically adjusted to at least one of a threshold value or a mute state so that the user may focus on the menu screen.

The automatically adjusting the volume value to less than or equal to a threshold value or a mute state when a specific type of content is output is a function provided for convenience of a user. In this example, even if the control signal for changing the volume value of the electronic apparatus 100 is repeatedly received a threshold number of times or more from the remote controller, the volume value of the content providing apparatus 200 does not need to be changed.

The processor 130 may identify whether a specific type of content is output to the display by receiving information that the content currently output to the display from the content providing apparatus 200 is a specific type of content or whether a specific type of content is output on the display based on at least one of the output screen information of the display.

For example, the processor 130 may capture an output screen of the display at a predetermined period to obtain a plurality of captured images, and may identify whether a specific type of content is output to the display based on a difference in pixel values among the plurality of captured images.

The processor 130 may identify a pixel value of the plurality of captured images. Specifically, the processor 130 may divide the entire pixels in the image into blocks of n*m pixels and identify pixel values according to the position of each block. The processor 130 may identify a case where a difference in pixel values according to the position of each block among the plurality of captured images is less than or equal to a threshold value, and if a captured image that is less than or equal to a threshold value is identified continuously more than a threshold number of times, may identify that a specific type of content is output on the display.

While the menu screen is being displayed, a pixel value of the output screen may not significantly change and thus, whether the output is a menu screen may be identified according to the embodiment.

For example, the processor 130 may capture an output screen on a one-second cycle and if the pixel value difference among three consecutive captured images is less than or equal to a threshold value, the processor 130 may identify that a menu screen is output on the current display.

As another example, the processor 130 may store pixel value information of a specific type of content and identify whether a specific type of content is output to the display based on the stored pixel value information and the pixel value difference of the captured image.

The processor 130 may store the pixel values according to the position of each block forming the menu screen in the memory 120, and capture the output screen of the display at a predetermined period. The processor 130 may identify a pixel value of the plurality of captured images and compare the pixel values of the stored menu screen and the pixel values of the captured image. The processor 130 may identify that a specific type of content is output to the display if the captured image in which the pixel value difference between the pixel value of the stored menu screen and the pixel value of the captured image is less than or equal to a threshold value is identified repeatedly for threshold number of times or more.

The processor 130 may identify whether a specific type of content is output to the display based on a pixel average value regardless of block division of an image.

As another example, the processor 130 may capture an output screen of the display at a predetermined period, and if there is a mark indicative of a specific type of content in the captured image, the processor 130 may identify that a specific type of content is output on the display.

For example, if the mark indicative of the menu screen such as "full menu", "menu", "setting" or the like, is displayed in the captured image, the processor 130 may identify that the menu screen is output on the display. The processor 130 may identify the mark indicative of a specific type of content via a character recognition scheme, such as OCR.

The processor 130 may identify whether the volume value of the content providing apparatus 200 reaches a threshold value by analyzing a control signal for changing the volume value of the content providing apparatus 200, and may change the volume value of the electronic apparatus 100 when a control signal for changing the volume value from the remote controller is additionally received after the volume value of the content providing apparatus 200 reaches a threshold value.

The processor 130 may identify whether the volume value has reached a threshold value based on the LKFS information included in the input signal transmitted from the content providing apparatus. If the control signal for changing the volume value from the remote controller is additionally received after the volume value reaches the threshold value, it may no longer be necessary to increase the volume value of the content providing apparatus 200 and thus, the processor 130 may change the volume value of the electronic apparatus 100.

For example, the volume threshold value of a content providing apparatus 200 may be 15, the control signal for increasing the volume value of the electronic apparatus 100 from the remote controller may be repeatedly received for a threshold number of times or more, and the volume value of the current content providing apparatus may be 13. In this example, when the volume value increase signal is received after the volume value of the content providing apparatus 200 is increased to reach 15, the processor 130 may increase the volume value of the electronic apparatus 100 according to a control command after the volume value of the content providing apparatus 200 reaches 15.

That is, after the volume value of the content providing apparatus 200 reaches a threshold value, the remote controller may switch to a control signal that increases the volume value of the electronic apparatus 100. In this example, the processor 130 may transmit the volume value information of the content providing apparatus 200 in real time to the remote controller or may transmit the volume value information of the content providing apparatus 200 based on specific timing. The remote controller may identify whether the volume value of the content providing apparatus 200 reaches a threshold value based on information transmitted from the electronic apparatus 100 and control signal information transmitted to the content providing apparatus 200.

When the volume change command is received at the remote controller based on specific timing (for example, current time), the processor 130 may transmit the control signal to change the volume value of the electronic apparatus 100 to the remote controller.

After the volume reaches the threshold value, the remote controller may change the signal to control signal to increase the volume value of the electronic apparatus 100 and transmit the signal.

Alternatively, the processor 130 may identify a control signal transmitted from the remote controller based on the control code information of the content providing apparatus 200 as a signal for controlling the electronic apparatus 100 and increase the volume value of the electronic apparatus 100. In this example, the processor 130 may control the content providing apparatus 200 so that the content providing apparatus 200 does not operate according to a control signal transmitted from the remote controller. When the content providing apparatus 200 operates according to a control signal transmitted from the remote controller, the volume values of the electronic apparatus 100 and the content providing apparatus 200 may increase by one control command.

The processor 130 may control display timing of at least one of a volume user interface (UI) of the content providing apparatus 200 or a volume UI of the electronic apparatus 100 so that the volume UI of the content providing apparatus 200 does not overlap with the volume UI of the electronic apparatus 100.

For example, when the volume value of the content providing apparatus 200 rises according to the first control command and reaches a threshold value, the volume value of the electronic apparatus 100 may be increased according to a second control command repeatedly inputted after the first control command. When the first control command and the second control command are inputted in a short time, the volume UI of the content providing apparatus 200 and the volume UI of the electronic apparatus 100 may be displayed in an overlapped manner. The processor 130 may address the problem that the volume UI is displayed in an overlapped manner by controlling the display time of at least one of the volume UI of the content providing apparatus 200 or the volume UI of the electronic apparatus 100.

For example, after the volume UI of the content providing apparatus 200 is displayed and then disappears, the processor 130 may display a volume UI of the electronic apparatus 100 or display a volume UI only of the content providing apparatus 200. In some examples, the processor 130 may display only the volume UI of the electronic apparatus 100.

According to another embodiment, if it is identified that the volume control of the content providing apparatus 200 is necessary, the processor 130 may provide a UI for guiding the volume control of the content providing apparatus 200.

The processor 130 may identify a threshold value of the content providing apparatus 200 using a learning network model. The learning network model may be a model for predicting a threshold value of the content providing apparatus 200 based on learning data.

For example, the learning network model may manage a volume history for each content providing apparatus 200, learn a volume history, and identify a threshold volume value for each content providing apparatus 200. The learning network model may perform re-learning by using the identified threshold values as learning data.

A function related to the learning network model may operate through the processor and the memory. The processor and the memory may correspond to the processor 130 and the memory 120 of the electronic apparatus 100 or a processor and a memory of a data learning server.

The processor may include one or a plurality of processors. The one or a plurality of processors may be a general-purpose processor such as CPU and AP, a graphics-only processor such as GPU, or an AI-dedicated processor such as NPU.

The one or a plurality of processors may control the processing of input data according to a predefined operating rule stored in a memory or AI model. The predefined operating rule or learning network model may be made by learning.

Here, being made through learning may mean that, by applying learning algorithm to a plurality of learning data, a learning network model of a desired characteristic is made. Such learning may be accomplished in the machine itself in which the learning network model is performed, and may be implemented via a separate server/system.

The learning network model may be composed of a plurality of neural network layers. Each layer may have a plurality of weight values, and may perform a calculation of a layer through calculation of a plurality of weight values and a calculation result of a previous layer. Examples of neural networks include, but are not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN) and deep Q-Networks, and the neural network is not limited to the above-described example except when specified.

The learning algorithm is a method for training a predetermined target device (e.g., a robot) using a plurality of learning data to cause the device to make a determination or prediction by itself. Examples of learning algorithms include supervised learning, unsupervised learning, semi-supervised learning, or reinforcement learning, and the learning algorithm in the disclosure is not limited to the examples described above except when specified.

Only the volume value has been described above, but other embodiments may be applied to an operation utilizing a control signal other than a volume value. For example, if a channel change command is consecutively received from the remote controller for a threshold number of times or more, the processor 130 may transmit, to the remote controller, a control signal to change a channel of the content providing apparatus 200.

When the content provided by the content providing apparatus 200 is displayed, the channel of the content providing apparatus 200 may not be changed even though the remote controller of the electronic apparatus 100 transmits a channel change signal to the content providing apparatus 200. However, if the channel change command is repeatedly received, from the remote controller, a threshold number of times or more, the purpose of the user is identified as the channel change of the content providing apparatus 200 instead of the channel of the electronic apparatus 100. In this case, the processor 130 may transmit a control signal for changing the channel of the content providing apparatus 200 to the remote controller based on the control code information of the connected content providing apparatus 200. The remote controller may then transmit the received control signal to the content providing apparatus 200 so that the channel of the content providing apparatus 200 may be changed without a remote controller operation of the content providing apparatus 200.

In some embodiments, the remote controller of the electronic apparatus 100 may be an exclusive remote controller of the electronic apparatus 100. In other embodiments, the remote controller of the electronic apparatus 100 may be an integrated remote controller capable of controlling both the electronic apparatus 100 and the content providing apparatus 200.

In the same manner as the aforementioned embodiments, the electronic apparatus 100 may be controlled by the remote controller of the content providing apparatus 200.

Figure 3:
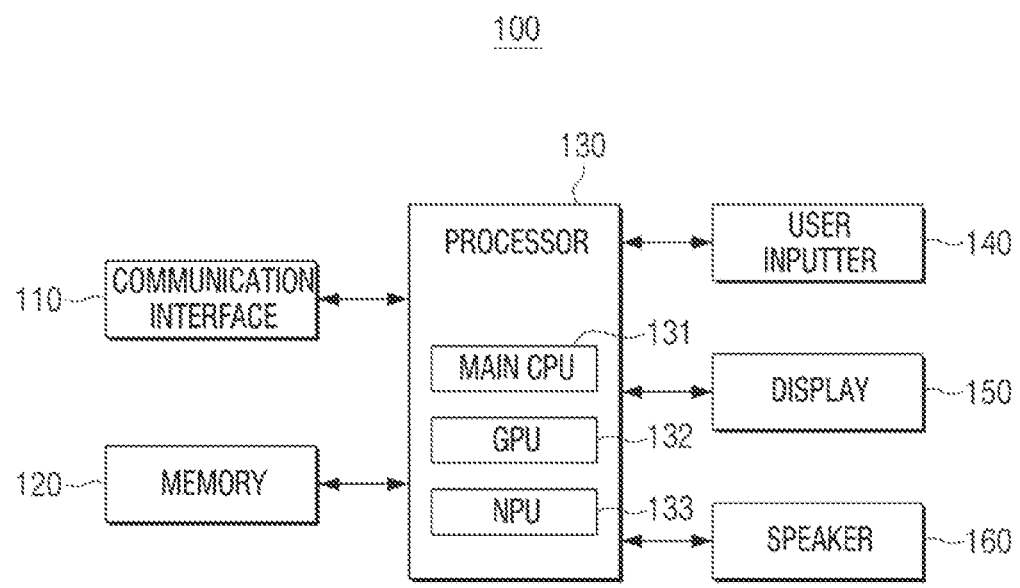
FIG. 3 is a block diagram illustrating a detailed configuration of an electronic apparatus.

FIG. 3 is a block diagram illustrating a configuration of an electronic apparatus.

Referring to FIG. 3, the electronic apparatus 100 includes the communication interface 110, the memory 120, the processor 130, a user inputter (or user input interface) 140, a display 150 and a speaker 160. Among the configurations of FIG. 3, the parts overlapped with the configurations of FIG. 2 will not be further described.

The processor 130 may control overall operations of the electronic apparatus 100 using various programs stored in the memory 120. The processor 130 may include a graphic processing unit (GPU) 132 for graphic processing corresponding to the image. The processor 130 may be implemented as a system on chip (SoC) including a core and the GPU 132. The processor 130 may include a single core, dual cores, triple cores, quad cores, and multiple cores.

The processor 130 includes a main CPU 131, GPU 132, and a neural processing unit (NPU) 133.

The main CPU 131 may access the memory 120 and perform booting using an operating system stored in the memory 120. The main CPU 131 may perform various operations using various programs and contents data, or the like, stored in the memory 120. According to an embodiment, the main CPU 131 may copy a program stored in the memory 120 to random access memory (RAM) according to an instruction stored in read-only memory (ROM), access the RAM, and execute a corresponding program.

The GPU 132 may correspond to a high performance processing device for graphics processing, and may be a specialized electronic circuit designed to accelerate image generation in a frame buffer to quickly process and change a memory and output the processed result to a screen. In addition, the GPU 132 may mean a visual processing unit (VPU).

The NPU 133 may be an AI chipset (or AI processor) and may be an AI accelerator. The NPU 133, may correspond to a processor chip that has been optimized for deep neural network performance. The NPU 133 may correspond to a processing device executing a deep learning model on behalf of the GPU 132, and the NPU 133 may correspond to a processing device executing a deep learning model with the GPU 132.

The user inputter 140 is configured to receive various user commands and information. The processor 130 may execute a function corresponding to a user command input through the user inputter 140, or store information input through the user inputter 140 in the memory 120.

The user inputter 140 may directly receive a change command, a volume value change command, or the like, from the user. The user inputter 140 may include a microphone for receiving a user command in a voice format, or a display (touch screen) for receiving a user command by a touch.

The display 150 may be a touch screen type forming a mutual layer structure with a touch pad. The touch screen may be configured to detect a touch input pressure as well as a touch input position.

The display 150 may be implemented with various forms such as a liquid crystal display (LCD), an organic light-emitting diode (OLED), liquid crystal on silicon (LCoS), digital light processing (DLP), quantum dot (QD) display panel, quantum dot light-emitting diodes (QLED), or the like.

As shown in FIG. 3, an embodiment may be implemented as an electronic apparatus (for example, TV) including the display 150. Alternatively, another embodiment may be implemented as a set-top box or a Blu-ray player not including the display 150, and the electronic apparatus 100 may receive content and transmit the received content to an external display device via the communication interface 110.

The speaker 160 may be configured to output sound in a volume of sound identified based on at least one of a volume value of the electronic apparatus 100 or a volume value of the content providing apparatus 200. Accordingly, when the volume value of the content providing apparatus 200 is small or is in a mute state, even if the volume value of the electronic apparatus 100 is large, the sound output may be small or may not be heard by the user.

As shown in FIG. 3, the electronic apparatus 100 may be implemented as an electronic device (e.g., a TV) equipped with a speaker 160. Alternatively, the electronic apparatus 100 may be implemented as a set-top box, or the like, not including the speaker 160, and the electronic apparatus 100 may receive the content and transmit the received content to an external device including the speaker through the communication interface 110.

Figure 4:
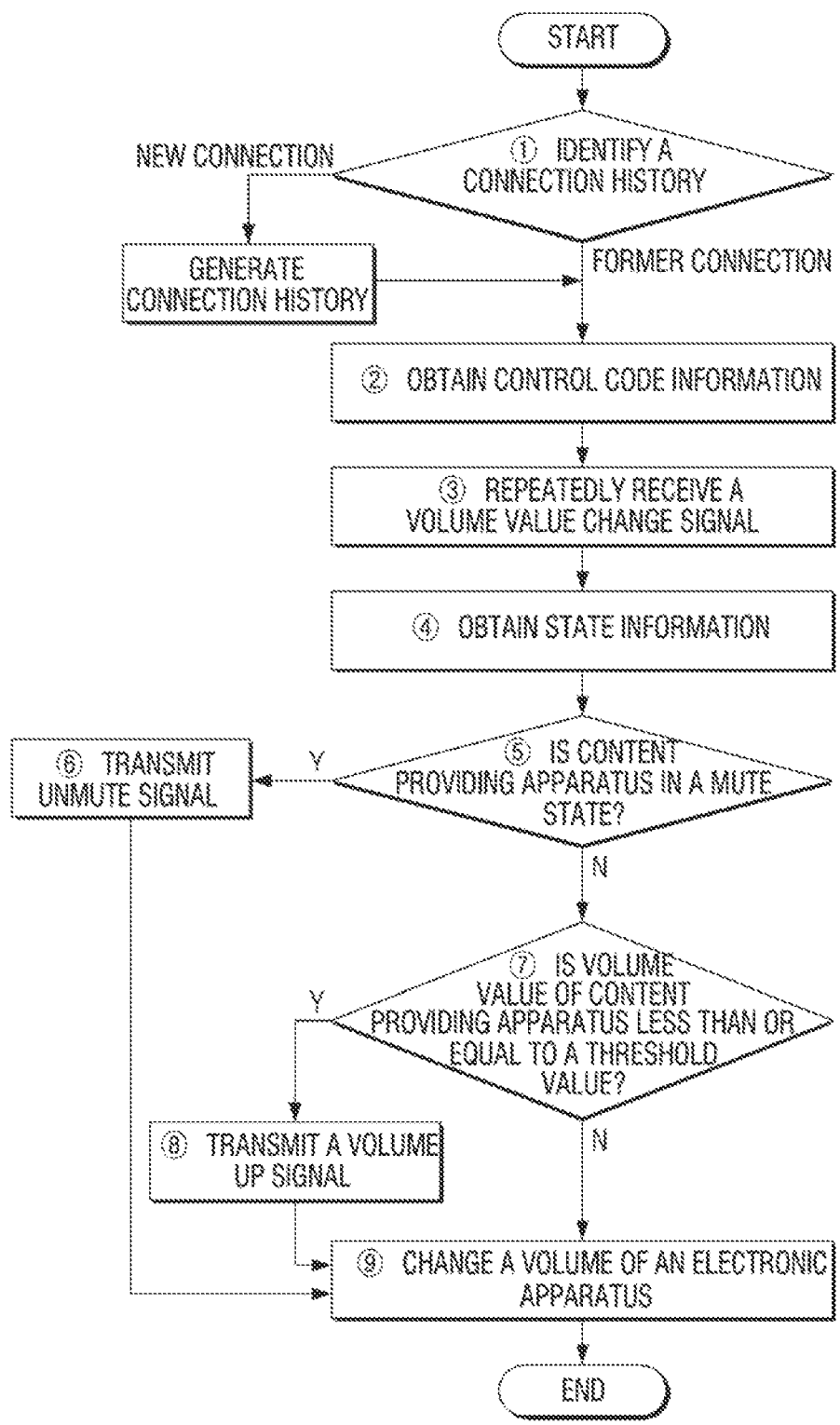
FIG. 4 is a flowchart showing an operation for adjusting a volume of a content providing apparatus according to an embodiment.

FIG. 4 is a diagram illustrating an operation to adjust a volume of a content providing apparatus according to an embodiment.

When the content providing apparatus 200 is connected to the electronic apparatus 100, the electronic apparatus 100 may check a connection history stored in the memory 120 to identify whether there is a connection history of the currently connected content providing apparatus 200 (operation ①).

If the content providing apparatus 200 is identified as a new connection, the electronic apparatus 100 may add the content providing apparatus 200 to its connection history.

If the content providing apparatus 200 has a former or pre-established connection history, the control code information of the corresponding content providing apparatus 200 may be obtained from the memory 120 based on the identification information of the content providing apparatus 200 (operation ②).

The electronic apparatus 100 may obtain the control signal which the remote controller of the content providing apparatus 200 transmits to the content providing apparatus 200 by sniffing, and may identity at least one candidate control code information associated with the obtained control signal. The electronic apparatus 100 may transmit each control signal based on at least one candidate control code information to the remote controller of the electronic apparatus 100 and identify one of the at least one candidate control code information based on a response state of the content providing apparatus 200 as the remote controller transmits a control signal to the content providing apparatus 200. The electronic apparatus 100 may then identify the content providing apparatus 200 based on the identified one control code information and obtain control code information corresponding to the identified content providing apparatus 200 from the memory 120 (operation ②).

The electronic apparatus 100 may identify whether a control signal for changing the volume value of the electronic apparatus 100 from a remote controller is repeatedly received a threshold number of times or more (operation ③). For example, the electronic apparatus 100 may identify whether a volume value increase signal is repeatedly input five times in a remote controller.

If a control signal for changing a volume value of the electronic apparatus 100 from a remote controller is repeatedly received a threshold number of times or more, the electronic apparatus 100 may obtain state information of the content providing apparatus 200 (operation ④).

The state information of the content providing apparatus 200 may include at least one of the current volume information of the content providing apparatus 200, the mute setting information of the content providing apparatus 200, or the content information provided from the content providing apparatus 200.

The electronic apparatus 100 may identify whether the content providing apparatus 200 is in a mute state based on the state information (operation ⑤).

The electronic apparatus 100 may identify whether the content providing apparatus 200 is in a mute state based on the LKFS information included in the input signal transmitted from the content providing apparatus 200.

If the content providing apparatus 200 is identified as being in a mute state, the electronic apparatus 100 may transmit to the remote controller a control signal that performs an unmute function based on the control code information (operation ⑥). The remote controller may transmit the received unmute to the content providing apparatus 200 so that the content providing apparatus 200 may be changed to an unmute state. Here, the unmute state may be a state in which a volume value before the mute state is present or the value is changed to a threshold value.

If the content providing apparatus 200 is identified as not being a mute state, the electronic apparatus 100 may identify whether the current volume value of the content providing apparatus 200 is below or equal to a threshold value based on the state information (operation ⑦).

The electronic apparatus 100 may identify whether the current volume value of the content providing apparatus 200 is less than or equal to a threshold value based on the LKFS information included in the input signal transmitted from the content providing apparatus 200.

If the volume value of the content providing apparatus 200 is identified to be less than or equal to a threshold value, the electronic apparatus 100 may transmit a control signal to the remote controller to increase the volume value of the content providing apparatus 200 based on the stored code information (operation ⑧).

The electronic apparatus 100 may identify whether the volume value of the content providing apparatus 200 reaches a threshold value, and may increase the volume value of the electronic apparatus 100, not the content providing apparatus 200, since the volume value of the content providing apparatus 200 does not need to be increased when the volume value of the content providing apparatus 200 reaches a threshold value. If a control signal for increasing the volume value from the remote controller is additionally received after the volume value reaches a threshold value, the volume value of the electronic apparatus 100 may be increased.

If the volume value of the content providing apparatus 200 is identified as not being less than or equal to a threshold value, the electronic apparatus 100 may increase the volume value based on the volume increase signal received from the remote controller (operation ⑨).

Figure 5:
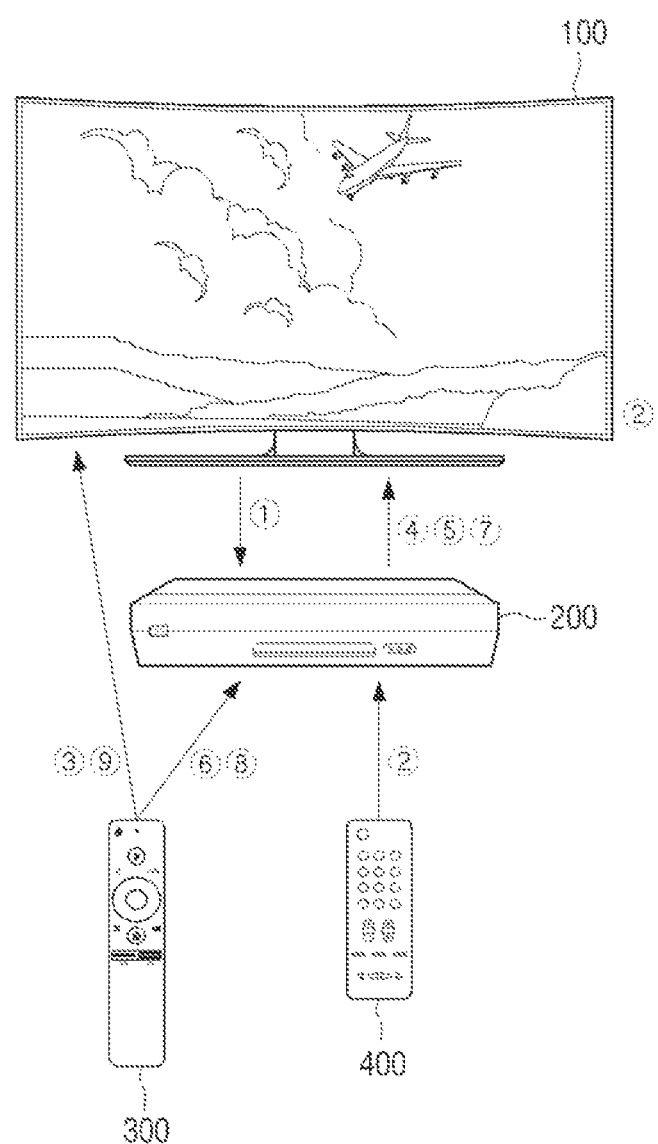
FIG. 5 is a diagram illustrating an operation between an electronic apparatus, a content providing apparatus, a remote controller of the electronic apparatus, and a remote controller of the content providing apparatus according to an embodiment.

FIG. 5 is a diagram illustrating an operation between an electronic apparatus 100, a content providing apparatus 200 a remote controller 300 of the electronic apparatus 100, and a remote controller 400 of the content providing apparatus 200 according to an embodiment.

The operations ① to ⑨ as shown in FIG. 5 represent the same operations as ① to ⑨ of FIG. 4.

If the content providing apparatus 200 is connected to the electronic apparatus 100, the electronic apparatus 100 may identify a connection history stored in the memory 120 and identify whether there is a connection history of the currently connected content providing apparatus 200 (operation ①).

If the content providing apparatus 200 has an existing connection history, the control code information of the corresponding content providing apparatus 200 may be obtained from the memory 120 based on the identification information of the content providing apparatus 200 (operation ②).

The electronic apparatus 100 may obtain control code information corresponding to the content providing apparatus 200 by sniffing of a control signal transmitted from a remote controller 400 of the content providing apparatus 200 to the content providing apparatus 200 (operation ②).

The electronic apparatus 100 may identify whether a control signal for changing the volume value of the electronic apparatus 100 is received from the remote controller 300 repeatedly a threshold number of times or more (operation ③).

If the control signal for changing the volume value of the electronic apparatus 100 is repeatedly received from the remote controller 300 a threshold number of times or more, the electronic apparatus 100 may obtain the state information of the content providing apparatus 200 (operation ④).

The electronic apparatus 100 may identify whether the content providing apparatus 200 is in a mute state based on the state information (operation ⑤).

If the content providing apparatus 200 is identified as being in a mute state, the electronic apparatus 100 may transmit to the remote controller 300 a control signal to perform an unmute function based on the control code information (operation ⑥).

If the content providing apparatus 200 is identified as not a mute state, the electronic apparatus 100 may identify whether the current volume value of the content providing apparatus 200 is below a threshold value based on the state information (operation ⑦).

If the volume value of the content providing apparatus 200 is identified to be less than or equal to a threshold value, the electronic apparatus 100 may transmit to the remote controller 300 a control signal for increasing the volume value of the content providing apparatus 200 based on the stored code information (operation ⑧).

If the volume value of the content providing apparatus 200 is identified as not being less than or equal to a threshold value, the electronic apparatus 100 may increase the volume value based on the volume increase signal received from the remote controller 300 (operation ⑨).

Figure 6:
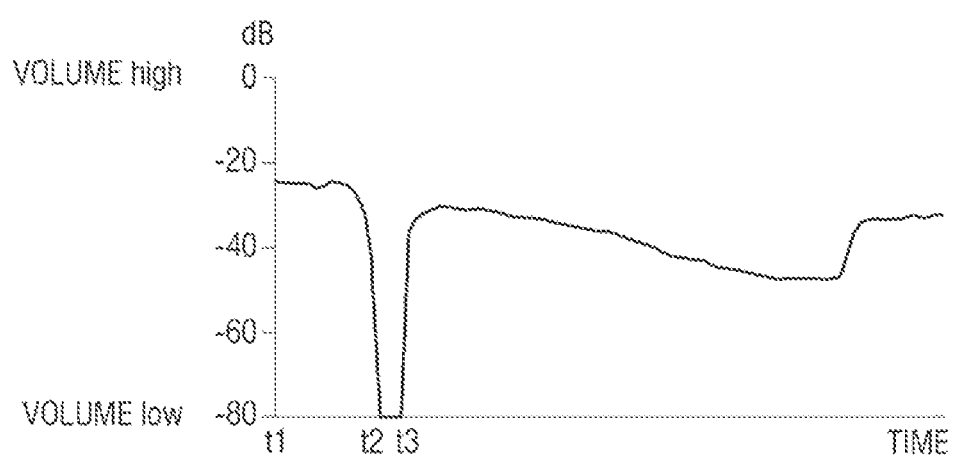
FIG. 6 is a graph illustrating loudness K-weighted relative to full scale (LKFS) included in an input signal transmitted from a content providing apparatus according to an embodiment.

FIG. 6 is a diagram illustrating information on LKFS included in an input signal transmitted from a content providing apparatus according to an embodiment.

The LKFS represents a standard unit of a volume value calculated in consideration of auditory recognition feature of a human.

For example, if the volume of the sound corresponding to the predetermined volume value of the content providing apparatus 200 is −24 dB or less based on the LKFS information included in the input signal, the electronic apparatus 100 may identify the current volume value of the content providing apparatus 200 to be less than or equal to a threshold value. If the volume of the sound corresponding to the predetermined volume value of the content providing apparatus 200 is less than −80 dB, the electronic apparatus 100 may identify that the content providing apparatus 200 is in a mute state.

Referring to FIG. 6, the electronic apparatus 100 may identify that t1 and t2 are the states in which the volume value of the content providing apparatus 200 is less than or equal to a threshold value.

Since the volume of the sound corresponding to the volume value during t2 through t3 is less than −80 dB, the electronic apparatus 100 may identify the content providing apparatus 200 as a mute state during the corresponding period.

In addition, since the volume of the sound corresponding to the volume value at a time after t3 is less than or equal to −24 dB and greater than −80 dB, the electronic apparatus 100 may identify that the volume value of the content providing apparatus 200 is than or equal to a threshold value during a corresponding period.

Figure 7:
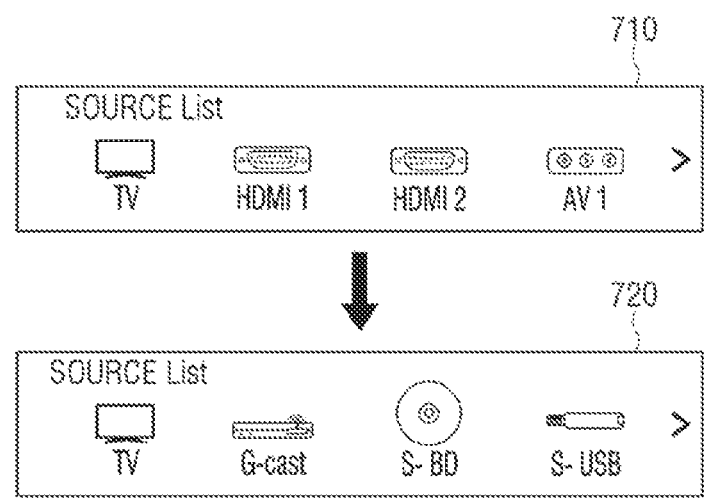
FIG. 7 is a diagram illustrating identification of content providing apparatuses according to an embodiment.

FIG. 7 is a diagram illustrating identification of content providing apparatuses according to an embodiment.

FIG. 7 shows a list of the content providing devices 200 connected to the electronic apparatus 100, for comparing a source list 710 before the device information of the content providing apparatus 200 is obtained and a source list 720 after the device information is obtained. The source list may be displayed on the display 150 based on to a user command through the remote controller 300.

If the electronic apparatus 100 obtains device information of the content providing apparatus 200 as in the above-described embodiment, the electronic apparatus 100 may update a source name corresponding to the content providing apparatus 200 based on the obtained device information of the content providing apparatus 200.

Referring to FIG. 7, before device information is obtained, the electronic apparatus 100 may be provided with a source list including a source port name (HDMI 1, HDMI 2, AV 1, etc.) in the electronic apparatus 100 before the device information is obtained. After the device information is obtained, the source list may be updated with the source name including the identification information (G-cast, S Blu-ray disk, S-USB, etc.) of the content providing apparatus 200. For example, the updated source list 720 may be provided with information about business provider information, device types, and the like. For example, if the content providing apparatus 200 is implemented as a set-top box, the updated source list 720 may include provider information and device types, and when the content providing apparatus 200 is implemented as a Blu-ray, a DVD receiver (DVR), a home theater system (HTS) device, the content providing apparatus 200 may include manufacturer information and device names when the content providing apparatus 200 is implemented as an over-the-top (OTT) device or a gaming device. On the updated source list 720, business provider information provided by the connected content providing apparatus 200, the type of the device, or the like, may be automatically displayed, but the user may input information about a type of the device directly to the electronic apparatus 100 through the user inputter 140.

The device information of the content providing apparatus 200 may be used for updating a source name as described above, and also be transmitted to an external server and collected. Accordingly, the external server may provide a service suitable to the business provider of the content providing apparatus 200 through the electronic apparatus 100. For example, an electronic program guide (EPG) corresponding to a business provider of the content providing apparatus 200 may be provided to the electronic apparatus 100. The device information of the content providing apparatus 200 may also be used for statistical purposes.

Figure 8:
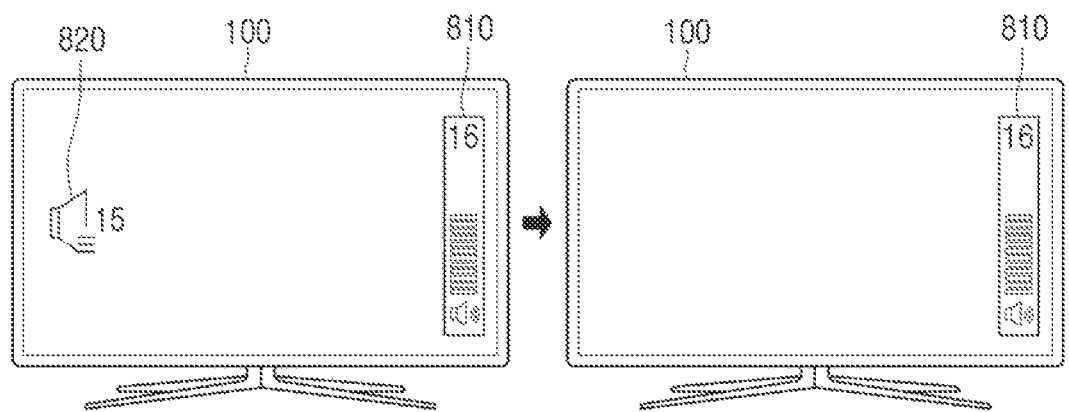
FIG. 8 is a diagram illustrating a volume UI according to an embodiment.

FIG. 8 is a diagram illustrating a volume UI according to an embodiment.

For example, if the volume value of the content providing apparatus 200 rises according to a first control command and reaches a threshold value, the volume value of the electronic apparatus 100 may be increased according to a second control command repeatedly inputted after the first control command. When the first control command and the second control command are inputted in a short time, the volume UI 810 of the content providing apparatus 200 and the volume UI 820 of the electronic apparatus 100 may be overlapped and displayed as shown in the left drawing of FIG. 8. In FIG. 8, although the volume UI 810 of the content providing apparatus 200 and the volume UI 820 of the electronic apparatus 100 are shown as being displayed in different areas, the two UIs 810 and 820 may be displayed in an adjacent area causing overlap or interference with each other.

Accordingly, the electronic apparatus 100 may control the display time of at least one of the volume UI of the content providing apparatus 200 or the volume UI of the electronic apparatus 100 so that the volume UI is not displayed as being overlapped.

For example, a volume UI 820 of the electronic apparatus 100 may not be displayed when the volume UI 810 of the content providing apparatus 200 is displayed as shown in the right drawing of FIG. 8. Alternatively, the electronic apparatus 100 may display only one of the volume UI of the content providing apparatus 200 or the volume UI of the electronic apparatus 100.

Figure 9:
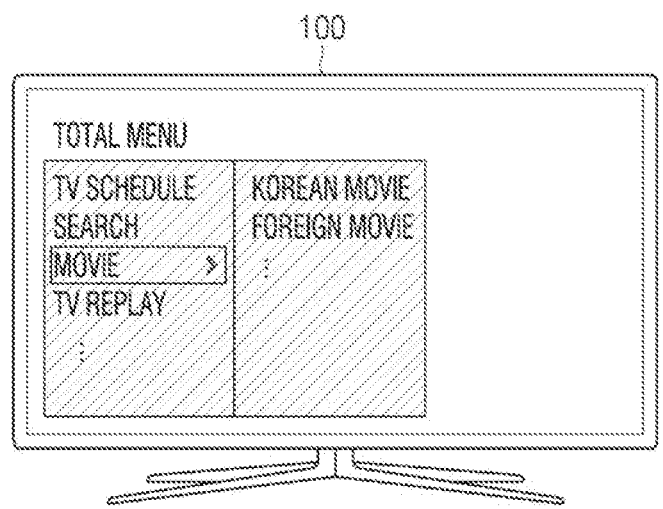
FIG. 9 is a diagram illustrating an example of outputting content of a specific type according to an embodiment.

FIG. 9 is a diagram illustrating an example of outputting content of a specific type according to an embodiment.

If the content currently output to the display 150 is a specific type of content, the electronic apparatus 100 may not transmit to the remote controller 300 a control signal for changing the volume value of the content providing apparatus 200, even if the control signal for changing the volume value of the electronic apparatus 100 is repeatedly received a threshold number of times or more from the remote controller 300. The content of the specific type is the content in which the volume value of the content providing apparatus 200 is automatically adjusted to at least one of a mute state or a threshold value or below, and may be, for example, a menu screen provided by the content providing apparatus 200 as shown in FIG. 9.

When the menu screen is displayed, all or a part of the display screen is hidden by the menu screen, so that the priority of the content displayed before the current menu screen is lower than the menu screen and the volume value of the content providing apparatus 200 may be automatically adjusted to at least one of a mute state or a threshold value or blow so that the user is able to focus on the menu screen.

When the specific type of content is output, the volume value is reduced due to the characteristic of the content, and in this case, the electronic apparatus 100 does not need to transmit a control signal for increasing the volume value of the content providing apparatus 200 to the remote controller.

FIG. 10 is a flowchart showing a method for controlling an electronic apparatus in which control code information of a content providing apparatus is stored according to an embodiment.

The electronic apparatus 100 may obtain state information of the content providing apparatus 200 when a control signal for changing the volume value of the electronic apparatus 100 is continuously received for a threshold amount of time or more from the remote controller 300 in operation S1010.

The state information may be information including at least one of the current volume information of the content providing apparatus 200, the mute setting information of the content providing apparatus 200, or the content information provided from the content providing apparatus 200.

The electronic apparatus 100 may identify whether a current volume value of the content providing apparatus 200 is less than or equal to a threshold value or the content providing apparatus 200 is in a mute state based on the state information in operation S1020.

The electronic apparatus 100 may identify whether the current volume value of the content providing apparatus 200 is below or equal to a threshold value or the content providing apparatus 200 is in a mute state based on the LKFS information included in the input signal transmitted from the content providing apparatus 200.

If the electronic apparatus 100 is identified as being below or equal to a threshold value or a mute state, a control signal for changing the volume value of the content providing apparatus 200 may be transmitted to the remote controller 300 based on the stored code in operation S1030.

If the currently output content is a specific type of content, the electronic apparatus 100 may not transmit a control signal to the remote controller 300. Here, the content of a specific type may be content that is automatically adjusted so that the volume value of the content providing apparatus 200 is less than or equal to a threshold value or a mute state.

The electronic apparatus 100 may capture an output screen at a predetermined period to obtain a plurality of captured images, and may identify whether a specific type of content is output based on a difference in pixel values between the plurality of captured images.

The electronic apparatus 100 may identify the content providing apparatus 200 based on at least one of a connection history of the content providing apparatus 200 or a control signal of the content providing apparatus 200 received from the outside, and obtain control code information corresponding to the identified content providing apparatus 200.

For example, the electronic apparatus 100 may identify the content providing apparatus 200 based on the identification information included in the input signal transmitted by the content providing apparatus 200, and may obtain control code information corresponding to the identified content providing apparatus 200.

As another example, a control signal which the remote controller 400 of the content providing apparatus 200 transmits to the content providing apparatus 200 may be obtained by sniffing and at least one candidate control code information related to the obtained control signal may be identified. Each control signal based on at least one candidate control code may then be transmitted to the remote controller 300 of the electronic apparatus 100. Based on the response state of the content providing apparatus 200 and in response to the response state of the content providing apparatus 200 due to transmitting the control signal to the content providing apparatus 200 by the remote controller 300, one of the at least one candidate control code information may be identified, and the content providing apparatus 200 may be identified based on the identified one control code information. Then, the electronic apparatus 100 may obtain control code information corresponding to the identified content providing apparatus 200.

The electronic apparatus 100 may identify whether a volume value of the content providing apparatus 200 reaches a threshold value from a control signal for changing a volume value of the content providing apparatus 200, and when a control signal for changing a volume value from the remote controller 300 is additionally received after the volume value of the content providing apparatus 200 reaches a threshold value, the electronic apparatus 100 may change a volume value of the electronic apparatus 100.

The electronic apparatus 100 may control at least one display time of the volume UI of the content providing apparatus 200 or the volume UI of the electronic apparatus 100 so that the volume UI of the content providing apparatus 200 and the volume UI of the electronic apparatus 100 do not overlap with each other.

The electronic apparatus 100 may identify a threshold value of the content providing apparatus 200 using a learning network model.

As described above, according to various embodiments, when the volume value of the content providing apparatus is low or the content providing apparatus is in a mute state, a control signal is transmitted to the remote controller of the electronic device to control the content providing apparatus.

Accordingly, it is not necessary to separately manipulate a remote controller of a content providing apparatus, which will be convenient for a user.

The methods according to the various embodiments as described above may be implemented as an application format installable in an existing electronic device.

The methods according to various embodiments may be implemented by software upgrade of a related art electronic apparatus, or hardware upgrade only.

The various embodiments described above may be performed through an embedded server provided in an electronic apparatus, or an external server of at least one electronic apparatus and a display device.

Various embodiments of the disclosure may be implemented in software, including instructions stored on machine-readable storage media readable by a machine (e.g., a computer). An apparatus may call instructions from the storage medium, and execute the called instruction, including an image processing apparatus (for example, image processing apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which data is semi-permanently stored in a storage medium from the case in which data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

In addition, one or more embodiments described above may be implemented in a computer readable medium, such as a computer or similar device, using software, hardware, or combination thereof. In some cases, the one or more embodiments described herein may be implemented by the processor itself. According to a software implementation, embodiments such as the procedures and functions described herein may be implemented with separate software modules. Each of the software modules may perform one or more of the functions and operations described herein.

According to some embodiments, computer instructions for performing the processing operations of the apparatus may be stored in a non-transitory computer-readable medium. The computer instructions stored in the non-transitory computer-readable medium may cause a particular apparatus to perform the processing operations on the apparatus according to the one or more embodiments described above when executed by the processor of the particular apparatus.

Non-transitory computer readable medium is a medium that semi-permanently stores data and is readable by the apparatus. Examples of non-transitory computer-readable media may include CD, DVD, hard disk, Blu-ray disk, USB, memory card, ROM, or the like.

According to various embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. An electronic apparatus comprising:
  a communication interface comprising circuitry;
  a memory storing a control code information of a content providing apparatus; and
  at least one processor configured to:
    based on repeatedly receiving, from a remote controller of the electronic apparatus, a control signal for changing a volume value of the electronic apparatus more than a threshold number of times through the communication interface, obtain state information of the content providing apparatus;
    identify a current volume value of the content providing apparatus or a state of the content providing apparatus, based on the state information; and
    based on the current volume value of the content providing apparatus being less than or equal to a threshold value or the content providing apparatus being in a mute state, control the communication interface to transmit a control signal to increase the volume value of the content providing apparatus to the remote controller of the electronic apparatus based on the control code information that is stored in the memory.

2. The electronic apparatus of claim 1, wherein the at least one processor is further configured to:
  identify the content providing apparatus based on at least one of a connection history of the content providing apparatus or a control signal transmitted from a remote controller of the content providing apparatus, and
  obtain the control code information corresponding to the identified content providing apparatus from the memory.

3. The electronic apparatus of claim 2, wherein the at least one processor is further configured to:

obtain the control signal which the remote controller of the content providing apparatus transmits to the content providing apparatus by sniffing, identify at least one candidate control code information associated with the obtained control signal, transmit a control signal based on each of the at least one candidate control code information to the remote controller of the electronic apparatus;

identify one of the at least one candidate control code information based on a response state of the content providing apparatus in response to the remote controller of the electronic apparatus transmitting the control signal of the identified one of the at least one candidate control code information to the content providing apparatus; and identify the content providing apparatus based on the identified one of the at least one candidate control code information.

4. The electronic apparatus of claim 1, wherein the state information comprises at least one of current volume information of the content providing apparatus, mute setting information of the content providing apparatus, or content information provided from the content providing apparatus.

5. The electronic apparatus of claim 4, further comprising a display, wherein the at least one processor is further configured to, based on content currently output to the display being a specific type of content, control the communication interface so as not to transmit the control signal to the remote controller of the electronic apparatus, and wherein the specific type of content is content in which a volume value of the content providing apparatus is automatically adjusted to less than or equal to the threshold value or the mute state.

6. The electronic apparatus of claim 5, wherein the at least one processor is further configured to:

obtain a plurality of captured images by capturing an output screen of the display in a predetermined cycle, and identify whether the specific type of content is output to the display based on a pixel value difference among the plurality of captured images.

7. The electronic apparatus of claim 1, wherein the at least one processor is further configured to:

identify whether the volume value of the content providing apparatus reaches the threshold value based on the control signal to change the volume value of the content providing apparatus, and based on receiving the control signal to change the volume value from the remote controller of the electronic apparatus after the volume value of the content providing apparatus reaches the threshold value, change the volume value of the electronic apparatus.

8. The electronic apparatus of claim 7, further comprising a display, wherein the at least one processor is further configured to control display timing of at least one of a volume user interface (UI) of the content providing apparatus or a volume UI of the electronic apparatus so that the volume UI of the content providing apparatus does not overlap with the volume UI of the electronic apparatus.

9. The electronic apparatus of claim 1, wherein the at least one processor is further configured to determine whether the current volume value of the content providing apparatus is less than or equal to the threshold value or the content providing apparatus is in the mute state based on loudness K-weighted relative to full scale information included in an input signal transmitted from the content providing apparatus.

10. The electronic apparatus of claim 1, wherein the at least one processor is further configured to identify a threshold volume value of the content providing apparatus using a learning network model.

11. A method for controlling an electronic apparatus having stored therein control code information of a content providing apparatus, the method comprising:

based on repeatedly receiving, from a remote controller of the electronic apparatus, a control signal to change a volume value of the electronic apparatus a threshold number of times or more, obtaining state information of the content providing apparatus;

identifying that a current volume value of the content providing apparatus is less than or equal to a threshold value or the content providing apparatus is in a mute state, based on the state information; and based on the identifying that the current volume value being less than or equal to the threshold value or the content providing apparatus being in the mute state, transmitting a control signal to increase the volume value of the content providing apparatus to the remote controller of the electronic apparatus based on the control code information that is stored.

12. The method of claim 11, further comprising:

identifying the content providing apparatus based on at least one of a connection history of the content providing apparatus or a control signal transmitted by a remote controller of the content providing apparatus; and obtaining the control code information corresponding to the identified content providing apparatus.

13. The method of claim 12, wherein the identifying the content providing apparatus comprises:

obtaining the control signal which the remote controller of the content providing apparatus transmits to the content providing apparatus by sniffing, and identifying at least one candidate control code information associated with the obtained control signal;

transmitting a control signal based on each of the at least one candidate control code information to the remote controller of the electronic apparatus;

identifying one of the at least one candidate control code information based on a response state of the content providing apparatus in response to the remote controller of the electronic apparatus transmitting the control signal of the identified one of the at least one candidate control code information to the content providing apparatus; and identifying the content providing apparatus based on the identified one of the at least one candidate control code information.

14. The method of claim 11, wherein the state information comprises at least one of current volume information of the content providing apparatus, mute setting information of the content providing apparatus, or content information provided from the content providing apparatus.

15. The method of claim 14, further comprising, based on content currently output being a specific type of content, not transmitting the control signal to the remote controller of the electronic apparatus, wherein the specific type of content is content in which a volume value of the content providing apparatus is automatically adjusted to less than or equal to the threshold value or the mute state.

16. The method of claim 15, wherein the transmitting to the remote controller of the electronic apparatus comprises obtaining a plurality of captured images by capturing an output screen of the display in a predetermined cycle, and identifying whether the specific type of content is output based on a pixel value difference among the plurality of captured images.

17. The method of claim 11, further comprising:
identifying whether the volume value of the content providing apparatus reaches the threshold value from the control signal to change the volume value of the content providing apparatus; and
based on receiving the control signal to change the volume value from the remote controller of the electronic apparatus after the volume value of the content providing apparatus reaches the threshold value, changing the volume value of the electronic apparatus.

18. The method of claim 17, further comprising controlling display timing of at least one of a volume user interface (UI) of the content providing apparatus or a volume UI of the electronic apparatus so that the volume UI of the content providing apparatus does not overlap with the volume UI of the electronic apparatus.

19. The method of claim 11, wherein the identifying that the current volume value of the content providing apparatus is less than or equal to the threshold value or the content providing apparatus is in the mute state comprises identifying whether the current volume value of the content providing apparatus is less than or equal to the threshold value or the content providing apparatus is in the mute state based on loudness K-weighted relative to full scale information included in an input signal transmitted from the content providing apparatus.

20. The method of claim 11, further comprising identifying a threshold volume value of the content providing apparatus using a learning network model.

* * * * *